United States Patent
Langhoff et al.

(10) Patent No.: US 10,350,955 B2
(45) Date of Patent: Jul. 16, 2019

(54) VEHICLE BODY STRUCTURE FOR A TWO-TRACK VEHICLE

(71) Applicant: AUDI AG, Ingolstadt (DE)

(72) Inventors: Hans-Jürgen Langhoff, Lenting (DE); Dominik Stiegler, Dietfurt (DE)

(73) Assignee: AUDI AG, Ingolstadt (DE)

( * ) Notice: Subject to any disclaimer, the term of this patent is extended or adjusted under 35 U.S.C. 154(b) by 73 days.

(21) Appl. No.: 15/666,937

(22) Filed: Aug. 2, 2017

(65) Prior Publication Data

US 2018/0037079 A1 Feb. 8, 2018

(30) Foreign Application Priority Data

Aug. 3, 2016 (DE) .................. 10 2016 214 344

(51) Int. Cl.
| | |
|---|---|
| *B62D 27/02* | (2006.01) |
| *B60G 15/04* | (2006.01) |
| *B60G 3/20* | (2006.01) |
| *F16F 1/00* | (2006.01) |

(52) U.S. Cl.
CPC .............. *B60G 15/04* (2013.01); *B60G 3/20* (2013.01); *F16F 1/00* (2013.01); *B60G 2200/14* (2013.01); *B60G 2200/18* (2013.01); *B60G 2202/22* (2013.01)

(58) Field of Classification Search
CPC ...... B60G 15/04; B60G 3/20; B60G 2200/14; B60G 2200/18; B60G 2202/22; F16F 1/00
USPC ..... 280/124.133, 124.134, 124.135, 124.136
See application file for complete search history.

(56) References Cited

U.S. PATENT DOCUMENTS

| | | | |
|---|---|---|---|
| 9,205,874 B2* | 12/2015 | Schindler | ............... B62D 27/02 |
| 2004/0046336 A1* | 3/2004 | Jensen | ..................... B60G 7/00 |
| | | | 280/5.511 |
| 2008/0150250 A1* | 6/2008 | Preukschat | .......... B60G 11/181 |
| | | | 280/124.134 |

(Continued)

FOREIGN PATENT DOCUMENTS

| DE | 19901299 C1 | 9/2000 |
|---|---|---|
| DE | 102004008802 B4 | 9/2005 |

(Continued)

OTHER PUBLICATIONS

Examination Report dated May 4, 2017 of corresponding German application No. 102016214344.1; 12 pgs.

*Primary Examiner* — Toan C To

(74) *Attorney, Agent, or Firm* — Maier & Maier, PLLC

(57) ABSTRACT

A vehicle structure for a two-track vehicle provided with an auxiliary frame for a vehicle axle, in particular a rear axle, which is provided with a wheel suspension on the articulation points for wheel link on the superstructure side, which are connected to articulation points on the wheel carrier side, connected to a wheel carrier carrying a vehicle wheel, and which is equipped with a spring and/or damper unit, which is supported between a vehicle superstructure and the wheel suspension, wherein the wheel frame is connected to at least one auxiliary frame bearing in a manner that is decoupled from oscillations at the vehicle superstructure, and wherein the wheel and/or damping unit is equipped with a rotational damper. According to the invention, the auxiliary frame bearing is provided with a connection point at which is connected the rotational damper.

9 Claims, 5 Drawing Sheets

(56) References Cited

U.S. PATENT DOCUMENTS

2011/0278811 A1* 11/2011 Ohletz ................ B60G 11/183
                                                    280/124.106
2012/0261893 A1* 10/2012 Meitinger ................ B60G 3/20
                                                    280/124.13

FOREIGN PATENT DOCUMENTS

| DE | 102009005898 A1 | 7/2010 |
| DE | 102009051468 A1 | 5/2011 |
| DE | 102010039245 A1 | 2/2012 |
| DE | 102011101701 A1 | 11/2012 |
| DE | 102012021018 A1 | 5/2014 |
| EP | 1043516 A2 | 10/2000 |
| FR | 2986470 A1 | 8/2013 |

* cited by examiner

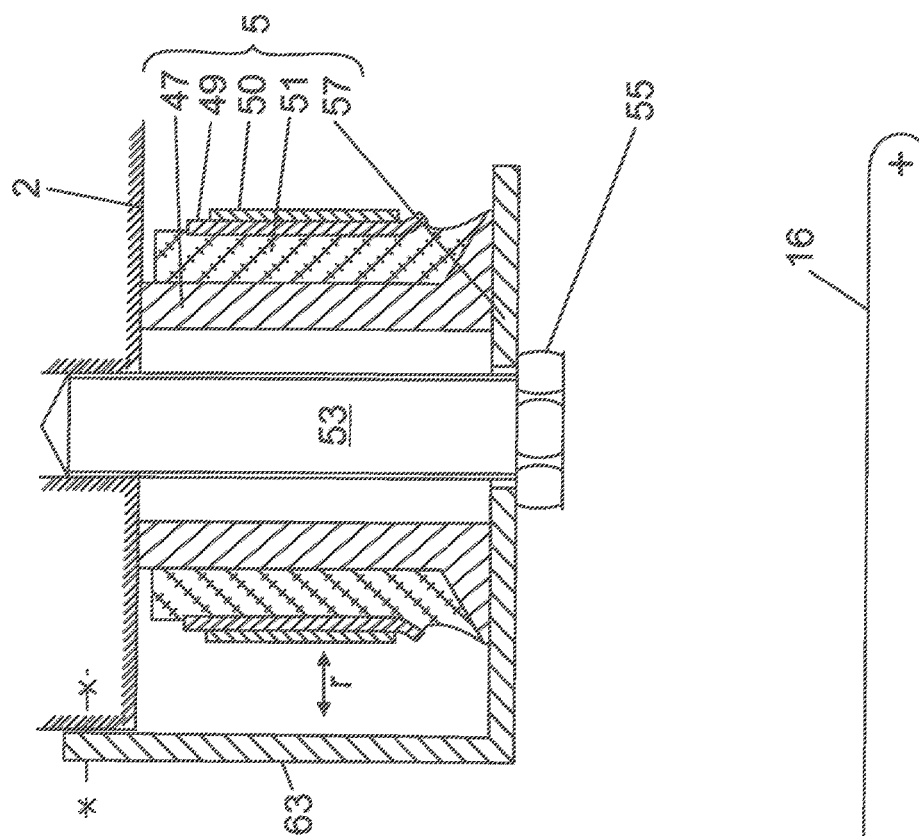
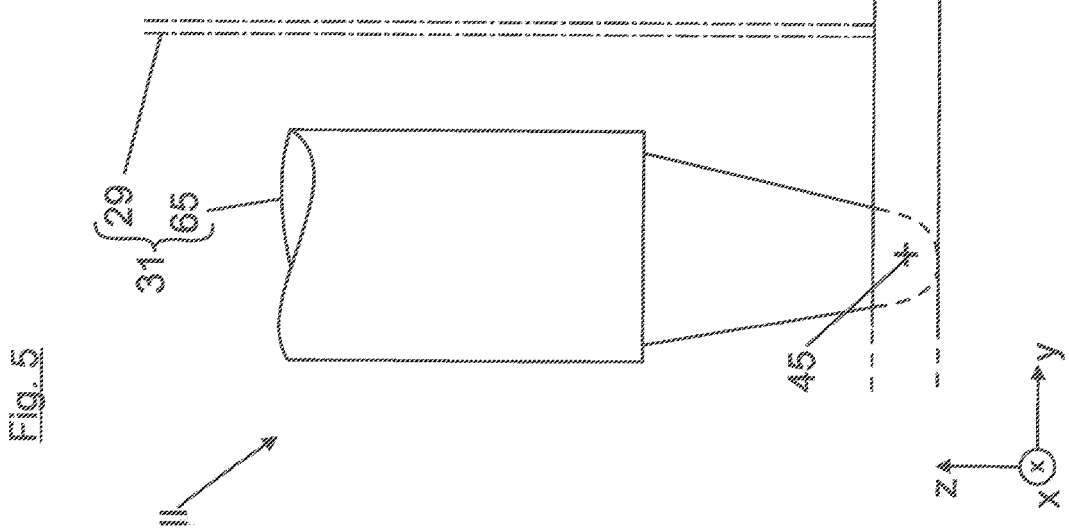
Fig. 5

VEHICLE BODY STRUCTURE FOR A TWO-TRACK VEHICLE

FIELD

The invention relates to a vehicle body structure for a two-track vehicle, as well as to a method for manufacturing a vehicle or a vehicle group consisting of vehicles according to a first vehicle variant and vehicles according to a second vehicle variant.

BACKGROUND

A wheel suspension between the vehicle body and the vehicle wheel is in practice commonly provided with a linear shock absorber as well as with a supporting spring, wherein they assume the suspension/damping functions and are either combined into a suspension strut or provided in a separated arrangement in the wheel suspension.

Instead of a linear shock absorber, the wheel suspension of a typical vehicle body structure is provided with a rotational damper. In addition, the vehicle body structure is equipped with an auxiliary frame (also referred to as an axle carrier) for a vehicle axle, which provides articulation points on the assembly side for wheel links of the wheel suspension. The wheel links are connected with their ends on the outer side of the vehicle to articulation points on the side of a vehicle carrier, which carries a vehicle wheel. The auxiliary frame is connected via an auxiliary frame bearing to the vehicle body in a vibration-free manner in order to reduce the noise in the interior of the vehicle during the driving operation.

From DE 199 01 299 C1 is known a connection of a stabilizer to an auxiliary frame (which is to say an axle support bearing). The axle support bearing is attached to the axle support by means of an outer bearing core. The inner bearing core is on the other hand connected via a screw bolt to the axle support.

Between the inner bearing core and the outer bearing core is vulcanized an elastomer body. The stabilizer is attached to the inner bearing core by means of a retaining clip. From FR 298 64 70 A1 is known an arrangement for a rotational damper which is attached by means of its housing to a longitudinal beam structure of a vehicle body. From EP 104 351 6 A is known a rotational damper which is positioned on a rear axle carrier. The position of the rotational damper is unfavorable to the extent that the secondary spring rates of the axle carrier bearing exert an influence on the rotational damping.

The object of the present invention is to provide a vehicle body structure for a two-track vehicle in which the available space in the wheel suspension is optimally used. In addition, the vehicle body structure is designed in such a way that a conventional linear shock absorber can be also installed instead of a rotational damper without major structural measures.

SUMMARY

According to the characterizing part of the invention, the auxiliary frame bearing is provided with a connecting point to which the rotational damper is connected. In accordance with the invention, the rotational damper can be connected with to the vehicle body its damper housing, in particular by being specifically connected to an auxiliary frame bearing core. The vehicle axle (in particular the rear axle) can be provided with a five-link assembly. In this case, the wheel carrier is connected to the vehicle with the five-link assembly (which is to say connected to the vehicle body), specifically with the interposition of the auxiliary frame (in particular the axle carrier). The axle carrier can be elastically suspended on the vehicle body with a plurality of axle support bearings. In this manner, the axle carrier is decoupled from the oscillations and from the movement of the vehicle body during the traveling operation. The axle carrier bearing is constructed for example from a bearing core and from an outer bearing sleeve. Between the bearing core and the outer bearing sleeve is vulcanized an elastomer body. As an alternative to this, instead of using an elastomer body, the damping of the vibrations can take place by means of hydraulic chambers, which are connected to each other via a flow channel and which generate hydraulic damping with a relative movement of the inner bearing core toward the outer sleeve. However, the connection of the rotary damper to the bearing core that is fixed to the body of the axle support bearing is essential in accordance with the invention.

It is preferred when a shock absorber is arranged between the vehicle body and the unsprung mass of the vehicle (that is to say the chassis elements such as the wheel carrier or the guide rods). The shock absorber is usually a linear shock absorber, which is hinged to a chassis guide rod and articulated with its upper end to the vehicle body. When a rotary damper is installed instead of a liner shock absorber, a connection point must be found which connects the vehicle body to the unsprung masses. In this case, the installed rotational damper should be easy to install and accessible to customer service. At the same time, however, the entire package of the motor vehicle axle in particular should also be positively influenced, so that the axle kinematics will not be changed with the installation of the rotational damper. This means that during the production of a vehicle variant having a built-in rotational damper, a vehicle variant with a liner shock absorber can be also built into the construction in parallel.

Further aspects of the invention will be described in the following in detail. So for example, instead of the inner bearing core mentioned above, the auxiliary frame bearing can be provided with a built-in bearing component and with a fixed auxiliary frame component, which is to say bearing components that are rigidly mounted at the auxiliary frame, between which acts an elastomer body. The rotational damper is in this case mounted rigidly on the built-in bearing component.

As was already mentioned, the rotational damper can be provided with a damper housing that is non-rotatably mounted on the auxiliary frame bearing. In the damper housing is positioned a rotor shaft that is rotatably mounted about a rotor axle, which can be driven by means of a driver lever with the inward and outward deflection movements of the wheel suspension. The damping effect in this case occurs between the rotor shaft and the damper housing. The rotational damper can be designed for example as a magnetorheological, electromagnetic or as a hydraulic rotational damper. In the case of an electrical rotational damper, the rotor shaft cooperates with the stator which is fixed to the housing.

The drive lever of the rotary damper can be supported, in particular by means of a coupling rod, on an articulation point of a wheel link of the wheel suspension. The coupling rod is pivotally supported not only on the wheel link, but also with an articulated connection to the driver lever. In a technical implementation, the rotational damper can be connected to the auxiliary frame bearing as follows: for example, the radial inner bearing core of the can be provided on its end facing away from the vehicle body with a holding element that is expanded in the radial direction. The holding element is expanded in the radial direction and prevents the radially outer bearing sleeve from becoming detached from the radially inner bearing core in the event of a damaged auxiliary frame bearing. The holding element can be arranged at an axial distance from the radially out bearing sleeve and from the vibration absorber (which is to say from the elastomer body). According to the invention, the holding element can have a double function in that it is additionally provided with a mounting section on which the rotational damper can be mounted, preferably by means of a screw connection, wherein a screw console on the damper housing is screwed to the mounting section of the holding element. The holding element is usually braced between a screw head of the bolt and an end face of the inner bearing core.

In order to ensure a perfect support for the rotational damper, the holding element can be additionally provided with an axial rib. This can be used to bridge over the receiving eyelet of the auxiliary frame with a free radial distance in the axial connection for a connection to the vehicle body (which is preferably connected to the vehicle body longitudinal support).

The outer radial bearing sleeve of the auxiliary bearing is in current practice designed so that it can be press-fitted into a receiving eyelet of the auxiliary frame bearing. The receiving eyelet of the auxiliary frame bearing can be preferably formed at a corner node point at which the transverse support of the auxiliary frame converges with an auxiliary frame-longitudinal carrier (so as not to impair the vibration absorbing function of the auxiliary frame bearing).

In the case of customer service, it is advantageous when the installed rotational damper is easily accessible from the lower side of the vehicle. Against this background, it is advantageous when the auxiliary frame bearing is positioned below the vehicle body in the direction of the height of the vehicle and the rotational damper projects downward from the auxiliary frame bearing. In addition, it is also advantageous when the rotational damper is positioned in the rear behind the link assembly, which means in the back of the rear side of the node point of the auxiliary frame. The rotor axle of the rotational damper can be oriented for mounting purposes in the longitudinal direction of the vehicle.

During the production of vehicles with different vehicle variants, it is preferred when as many identical parts are used for the installation in the different vehicle variants in order to reduce expenses connected with component parts. Against this background, the structure of the vehicle body can be designed so that the rotational damper is built into the first vehicle variant, while it is left out of a second vehicle variant of the rotational damper and replaced by a conventional linear shock absorber. The linear shock absorber is also supported on a articulation point of the wheel link. It is preferred when the articulation point of the wheel link is used not only to provide support for the linear shock absorber (second vehicle variant), but also for supporting the drive lever of the rotational damper (first vehicle variant).

The advantageous further embodiments and developments of the invention described above and/or in the dependent claims—except for example in cases of a clear dependence or incompatible alternatives—can be used individually or in any combination with each other.

The invention and its advantageous embodiments and further developments as well as their advantages will be next described in more details with reference to the figures.

BRIEF DESCRIPTION OF THE DRAWINGS

The figures show the following.

FIG. 5 a view according to FIG. 2 in a second vehicle variant.

DETAILED DESCRIPTION OF THE DRAWING

Figure 1:
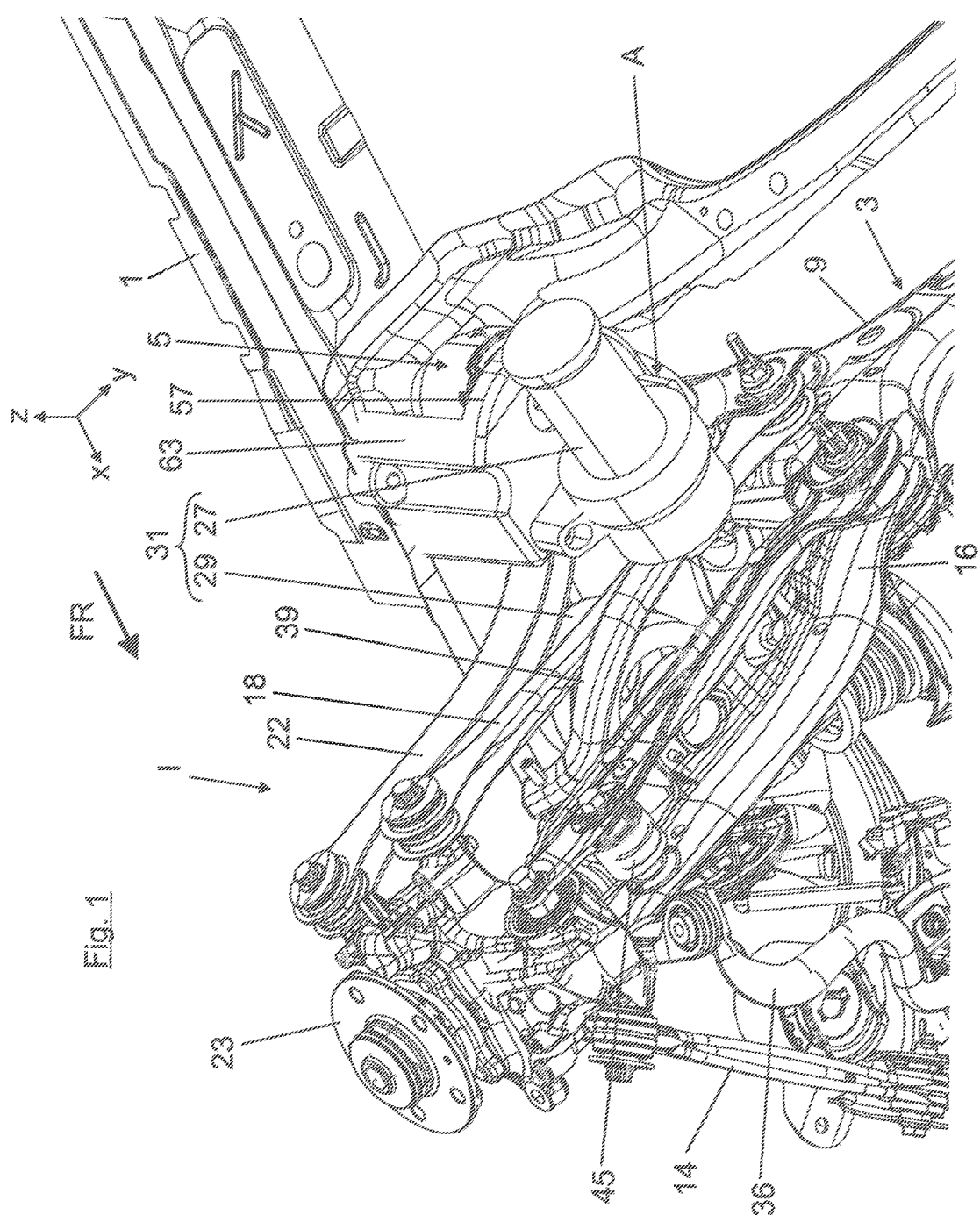
FIG. 1 A perspective partial illustration of a body structure of the first vehicle variant.
Figure 2:
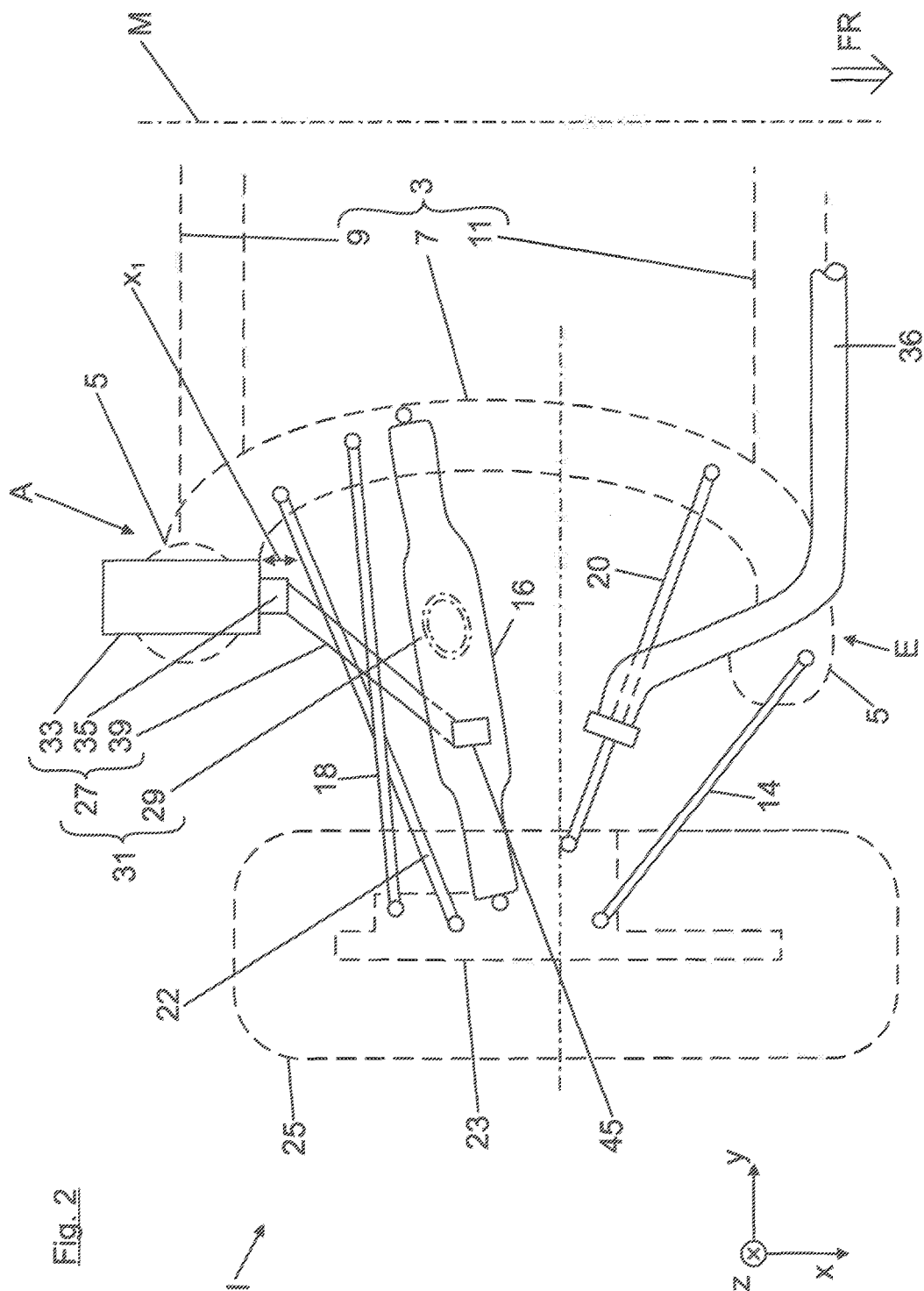
FIG. 2 a rough schematic view from below of the wheel suspension of the body structure.

FIG. 1 shows the body structure of a vehicle according to a first vehicle variant 1. Accordingly, the vehicle body structure is provided with a longitudinal vehicle body support 1, which is a part of a vehicle superstructure 2 (FIGS. 4 and 5) and extends in the longitudinal direction x of the vehicle. At the vehicle body longitudinal carrier 1 is mounted an auxiliary frame 3 for a vehicle rear axle 3, and in particular over an auxiliary frame bearing 5. The vehicle body structure is designed approximately with a mirror image relative to a central vehicle longitudinal axle M (FIG. 2). The auxiliary frame 3 is provided in common practice with lateral auxiliary frame longitudinal carriers 7, which are connected to one another via front and rear auxiliary frame transverse carriers 9, 11 and converge at the front and rear corner node points. At each of these corner node points, the auxiliary frame 3 is elastically connected via an auxiliary frame bearing 5 to the vehicle body 2.

According to FIGS. 1 and 2, link consoles are built on each of the auxiliary frame longitudinal carriers 7 which provide articulation points on the side of the superstructure for the wheel links 14, 16, 18, 20, 22. They therefore form a five-link assembly in this manner and they are hinged in the transverse vehicle direction y to a wheel carrier 23, which carries a vehicle wheel 25 as indicated by the dashed lines in FIG. 2. As can be seen from FIGS. 1 through 3, the wheel links 14, 16, 18 are grouped at a lower link level, while the links 20, 22 are positioned at an upper link level. The wheel suspension is in addition provided with a stabilizer rod 36 (FIG. 1 or 2) which engages in an articulated manner at the end the front upper wheel link 20 (FIG. 2).

Figure 3:
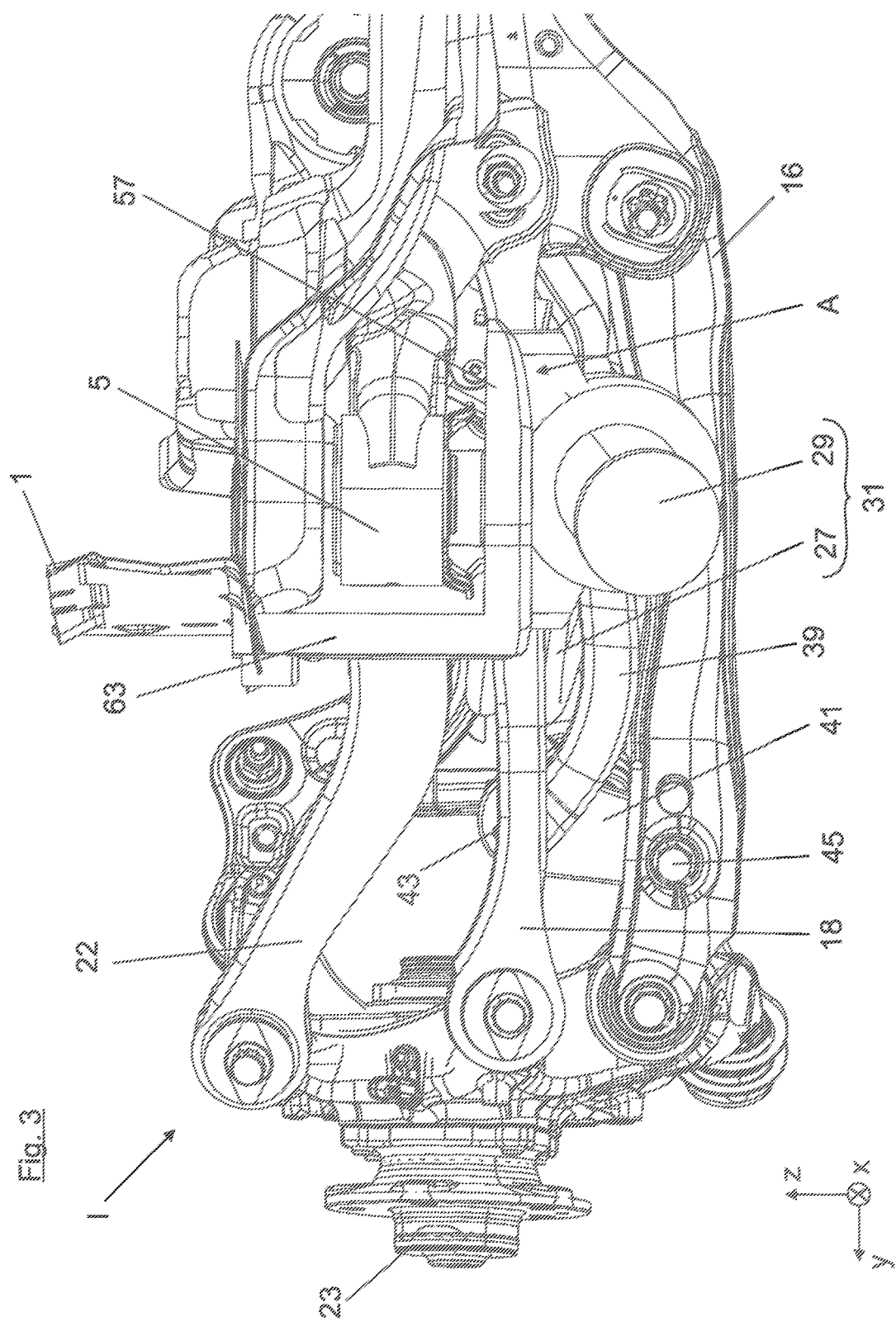
FIG. 3 the body structure in a view from the rear.

According to the FIG. 1 through 3, a rotational damper 27 is mounted at the rear corner node point of the auxiliary frame 3 at the auxiliary frame bearing 5, which together with a supporting spring 29 form a spring/damper unit 31. The supporting spring 29 is supported on the middle lower level by the wheel link 16.

Figure 4:
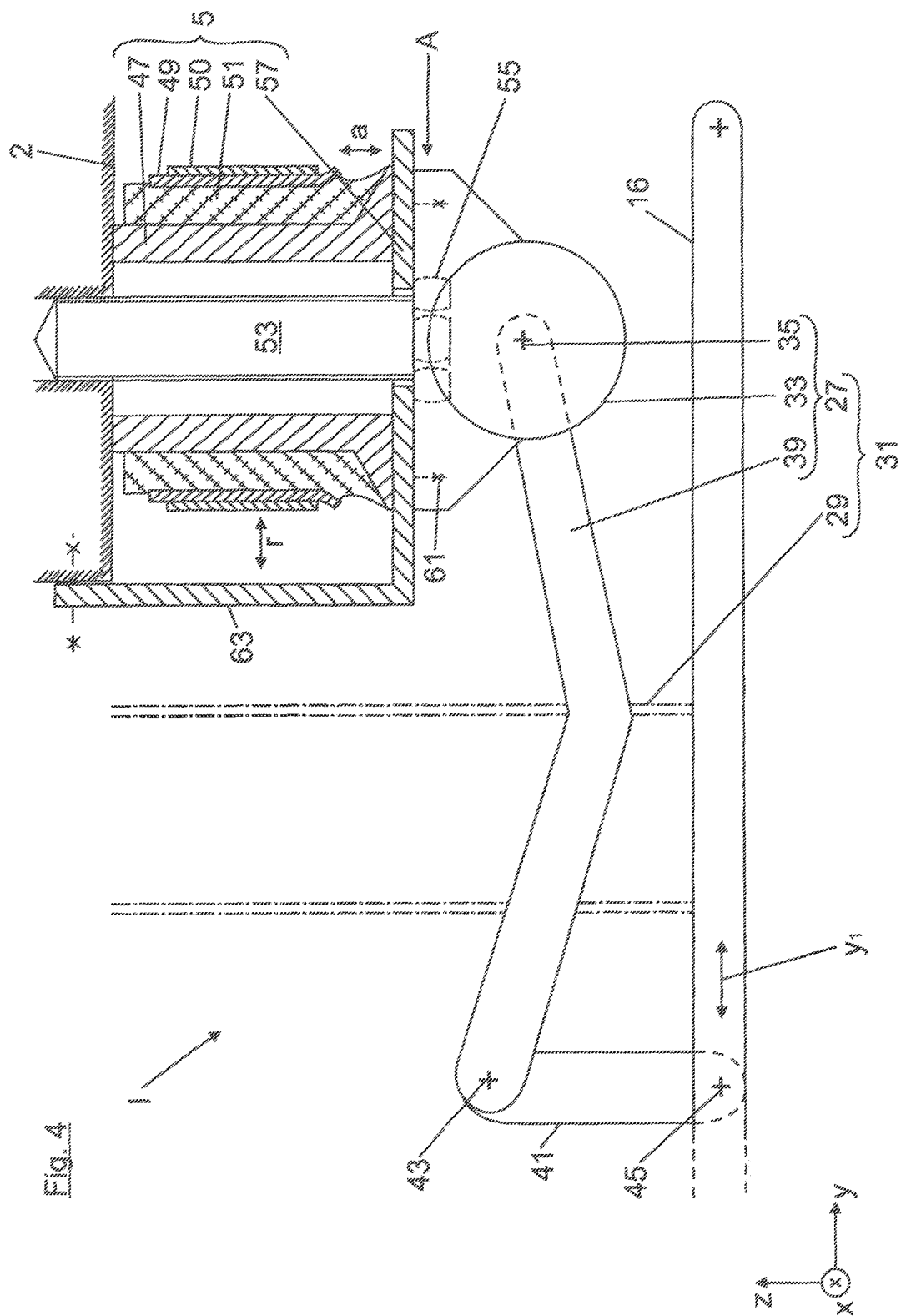
FIG. 4 a simplified lateral view of the body structure with an auxiliary frame bearing in a sectional view.

The rotational damper 27 is mounted with its damper housing 33 at a connection point A which will be described later on a auxiliary frame housing 5. Inside the damper housing 33 is pivotally mounted a rotor shaft about a rotor axis 35 (FIG. 4), which cooperates with a stator that is fixed to the housing. The rotor shaft is in the figures oriented in the vehicle longitudinal direction x and it can be driven by means of a drive lever 39 with the inward and outward spring movements of the wheel suspension. As can be seen in FIG. 3 or 4, the drive lever 39 is supported via a coupling rod 41 at the middle lower wheel link (which is to say a spring link) 16, and in particular at a distance created by a transverse offset y1 from the lower spring foot point of the support spring 29. The coupling rod 41 is connected in an articulated manner at upper and lower articulation points 43, 45 at the drive lever 39 and at a lower spring link 16.

Next, the superstructure of the rotational damper-connection point A at the auxiliary frame bearing will be explained as shown in FIG. 4: accordingly, accordingly, the auxiliary frame bearing 5 is constructed from a bearing core 47 in the form of a sleeve and a radial outer sleeve 49. An elastomer body 51 is vulcanized in the annular gap between the bearing core 47 and a radial outer sleeve 49. The inner bearing core 47 is screwed in rigidly with a screw 53 at the vehicle superstructure 2, which is to say at the vehicle body longitudinal carrier 1. As can be seen from FIG. 4, a disc-shaped holder element 57 is braced between the screw head 55 of the screw 53 and the front vehicle body longitudinal carrier 1 on the front side of the bearing 47 facing away from the vehicle body longitudinal carrier 1. The outer sleeve 49 of the auxiliary bearing 5 is pressed with press-fitting into a receiving eyelet 50 of the auxiliary frame 3.

In order to prevent a detachment of the auxiliary frame 3 from the vehicle body longitudinal carrier 1 in case of a malfunction of the auxiliary frame 5, the holding element 57 is expanded in the radial direction beyond the receiving eyelet 50 of the auxiliary frame 3.

The holding element 57 of FIG. 4 serves not only to secure the frame 3 on the vehicle body longitudinal support 1. The holding element 57 is additionally also provided with a mounting section to which the damper housing 33 is attached with a screw connection 61. So as to ensure a stable support of the rotational damper 27, the holding element 57 is also provided with an axial rib 63, which bridges over the receiving eyelet 50 with a free radial distance r in the axial direction, and which is connected at the vehicle superstructure 2 (which means on the car body longitudinal carrier 1 thereof).

In FIG. 1, the auxiliary frame 3 is connected via the auxiliary frame bearing 5 to the underside of the vehicle body longitudinal carrier 1.

The rotational damper 27 is also fastened to the underside of the auxiliary frame bearing 5 so as to provide easy access for tools in case of customer service from the underside of the vehicle. In order to further simplify the access for tools, the rotational damper is positioned at the rear side corner node point of the auxiliary frame 3, and in particular in such a way that the rotational damper is located at a longitudinal offset $x_1$ (FIG. 2) in the longitudinal direction x of the vehicle.

FIG. 5 shows the car body structure according to a second vehicle variant II, in which in contrast to the first vehicle variant I, a rotational damper 27 is not built into the structure, as a linear shock absorber 65 is used instead of it. The linear shock absorber 65 forms together with the carrier spring 29 the spring damper unit 31.

As shown in FIG. 5, the linear shock absorber 65 is hinged at a lower joint point 45 at the spring link 16. The position of the lower spring location 45 is in this case identical to the position of the articulation point 45 shown in FIG. 4, in which the drive lever 39 of the rotational damper 27 is hinged via the coupling rod 41.

The invention claimed is:

1. A vehicle body structure for a two-track vehicle, comprising:
with an auxiliary frame for a vehicle axle, which has articulation points on the articulation side for wheel links of a wheel suspension that are hinged to a wheel carrier carrying a vehicle wheel on the wheel carrier side of the articulation point, and which is provided with a spring and damper unit, which is supported between a vehicle superstructure and the wheel suspension, wherein the auxiliary frame is connected via at least one auxiliary frame bearing to the vehicle body structure while being decoupled from oscillations, and wherein the spring and damper unit is provided with a rotational damper, wherein the auxiliary frame bearing is provided with a connection point to which is connected the rotational damper.

2. The vehicle body structure according to claim 1, wherein the auxiliary frame bearing is provided with a first bearing component mounted rigidly on the vehicle body superstructure and with a second bearing component, which is rigidly mounted, on the auxiliary frame and which acts a vibration damper, and that the rotational damper is mounted rigidly on the first bearing component.

3. The vehicle body structure according to claim 1, wherein the rotational damper is provided with a damper housing built non-rotatably on the auxiliary frame bearing and a rotor shaft rotatably supported about a rotor axis, which can be driven via a drive lever with inward and outward spring movements of the wheel suspension, and that the damping effect occurs between the rotor shaft and the damper housing, and that the rotational damper is an electric rotational damper, wherein the rotor shaft cooperates with a stator mounted in a fixed manner in the housing.

4. The vehicle body structure according to claim 2, wherein a drive lever is supported by a coupling rod on an articulation point of a wheel link.

5. The vehicle body structure according to claim 2, wherein the first bearing component is a bearing core in the form of a radially inner sleeve through which is guided a screw rigidly braced with the bearing core on the vehicle body superstructure, and the second bearing component, which is fixed to the auxiliary frame, is a radially outer bearing sleeve which can be inserted into a receiving eyelet of the auxiliary frame.

6. The vehicle body structure according to claim 5, wherein the bearing core is provided at its end facing away from the vehicle body superstructure with a radially expanded holder element which is located at an axial distance from the radially outer bearing sleeve and from a vibration damper.

7. The vehicle body structure according to claim 6, wherein the holder element is provided with a mounting section for forming a rotational damper connection point, at which the rotational damper can be connected.

8. The vehicle body structure according to claim 6, wherein the holding element is provided with at least one axial rib, which is bridged over the receiving eyelet with a free radial distance in the axial direction and fixed at the vehicle body superstructure.

9. The vehicle body structure according to claim 1, wherein the auxiliary frame bearing is positioned in a vehicle direction below the vehicle superstructure, and the rotational damper protrudes downward from the auxiliary frame bearing.

* * * * *